United States Patent [19]

Morita

[11] Patent Number: 5,561,573
[45] Date of Patent: Oct. 1, 1996

[54] METHOD OF ASSEMBLING A TAPE CASSETTE AND SECURING A PLATE SPRING AND SHIELD PLATE THEREIN

[75] Inventor: Kiyoo Morita, Kanagawa, Japan

[73] Assignee: Fuji Photo Film Co., Ltd., Kanagawa, Japan

[21] Appl. No.: 260,739

[22] Filed: Jun. 15, 1994

[30] Foreign Application Priority Data

Jun. 16, 1993 [JP] Japan ................................ 5-168339

[51] Int. Cl.$^6$ ............................ G11B 23/02; G11B 15/60; G11B 23/087
[52] U.S. Cl. ................ 360/132; 360/130.3; 360/130.31; 360/130.32; 360/130.34
[58] Field of Search ........................... 360/130.3, 130.31, 360/130.32, 130.34, 132; 29/806, DIG. 28; 242/346

[56] References Cited

U.S. PATENT DOCUMENTS

| | | | |
|---|---|---|---|
| 4,731,687 | 3/1988 | Kagano et al. | 360/130.32 |
| 4,860,967 | 8/1989 | Meermans | 360/130.32 |
| 4,939,613 | 7/1990 | Flores, Jr. et al. | 360/132 |

*Primary Examiner*—John H. Wolff
*Assistant Examiner*—David D. Davis
*Attorney, Agent, or Firm*—Sughrue, Mion, Zinn, Macpeak & Seas

[57] ABSTRACT

A method of assembling a magnetic tape cassette, and a cassette are provided in which a magnetic shield plate and a plate spring having a pad attached thereto are incorporated very easily into upper and lower cassette halves and are free from chattering. The lower edge of the magnetic shield plate 20 fits into a groove, which is formed on a lower cassette half, and both ends of the plate spring 30 are dropped into receiving grooves at the front ends of projections formed on the lower cassette half. Thereafter, the upper cassette half, having ribs 26 and 36 which contact with the upper edges of the magnetic shield plate 20 and the plate spring 30, is placed on the lower cassette half, and the ribs are then melted by an ultrasonic welder. The magnetic shield plate and the plate spring are held by the molten resin.

2 Claims, 4 Drawing Sheets

METHOD OF ASSEMBLING A TAPE CASSETTE AND SECURING A PLATE SPRING AND SHIELD PLATE THEREIN

BACKGROUND OF THE INVENTION

The invention relates to a magnetic tape cassette and a method of assembling a magnetic tape cassette in which a plate spring having a press pad is disposed in the vicinity of a magnetic head hole which opens on the front face of the body case of the cassette consisting of upper and lower cassette halves, and a magnetic shield plate is disposed behind the plate spring.

Recently, as in the case of digital audio tape recorders and other electronic devices, cassette tape recorders are improving in the areas of miniaturization, lightness in weight, and performance. Correspondingly, audio magnetic tape cassettes need to enhance their performance and undergo various improvements.

FIGS. 6 to 8 show the basic structure of an audio magnetic tape cassette of the prior art. As shown in FIG. 6, in the magnetic tape cassette, a hollow inner space, which is defined by a pair of upper and lower cassette halves 1 and 2 (the upper cassette half is not shown), is divided into a record/reproduction region 4 and a hub housing region 5 by a partition 3.

In the hub housing region 5, hubs 12, rotation guide rollers 13, etc. are disposed so as to be symmetrical about the center line C, which elongates along the longitudinal direction, i.e., front and rear direction, of the cassette. In the record/reproduction region 4, capstan holes 6, cassette positioning holes 7, head pins 8, etc. are formed so as to be symmetrical about the center line C. A plate spring 10, which is a plate-like supporting member and which supports a press pad 9, is disposed behind the head pins 8, and a shield plate 20 is disposed behind the plate spring 10.

As shown in FIG. 8, when a record or reproduction process is to be conducted, a magnetic head 15 of a record/reproduction device is inserted into the record/reproduction region 4 through a magnetic head hole 14 on the front face of the cassette, and the front end of the magnetic head 15 pushes a magnetic tape T together with the press pad 9 into the cassette. As a result, the portion of the magnetic tape T extending between the paired head pins 8 is pressed against a head gap formed at the front end of the magnetic head 15, by the tension of the magnetic tape T and the urging force of the plate spring 10.

As shown in FIG. 7, the shield plate 20 has a U-like shape in the plan view and is positioned and fixed by fitting the upper edge 211 and the lower edge 212 of the shield body 21 into narrow grooves formed on the upper and lower cassette halves 1 and 2. As shown in FIGS. 6 and 8, the magnetic tape T contacts the paired head pins 8. During a recording or reproducing process, the magnetic tape T slides on the head pins 8. Also, the shield plate 20 magnetically shields the area behind the magnetic tape T so that the magnetic head 15 does not pick up noise from this area. The plate spring 10 having the press pad 9 at its center is movably fitted into small gaps formed between the front faces of wings 23 of the shield plate 20 and the paired head pins 8.

When a magnetic tape cassette of the above construction is used, the vibration of a driving system of the record/reproduction device may cause the shield plate 20 to vibrate. The vibration of the shield plate 20 makes the upper and lower edges 211 and 212 rub against and scrape the inner faces of the upper and lower cassette halves 1 and 2. Fine powder produced by the scraping scatters inside the cassette, thereby possibly causing drop-out.

To overcome this problem, various methods of fixing a magnetic shield plate have been proposed. For example, Japanese Utility Model Publication (Kokai) No. HEI2-123775 discloses a cassette wherein deformable receiving portions into which edges of a magnetic shield plate can bite are formed on inner faces of upper and lower cassette halves so as to respectively oppose upper and lower edges of the magnetic shield plate, or spikes protrude from upper and lower portions of a magnetic shield plate so that the spikes pierce inner faces of upper and lower cassette halves.

Japanese Utility Model Publication (Kokai) No. HEI2-65281 discloses a cassette wherein a magnetic shield plate is embedded in narrow ribs formed on inner faces of upper and lower cassette halves.

In the cassettes of the latter two Kokai, the magnetic shield plate is fixed into upper and lower cassette halves. However, when assembling the cassettes, finely crushed powder and scraped powder are unavoidably produced from the portions of the inner faces of the upper and lower cassette halves where the magnetic shield plate bites into the upper and lower cassette halves. Consequently, it is impossible to eliminate the possibility that such powder will adhere to the face of the magnetic tape and cause drop-out.

According to the method of positioning and fixing the shield plate 20 in a cassette assembling process, the plate spring 10 must be inserted into narrow clearances between the shield plate 20 and the head pins 8. For ease of assembly, (the work of dropping the plate spring into the clearances), the clearances must have a substantially large size. This causes a problem in that the plate spring 10 is provided with chattering along the longitudinal direction, and hence the press pad 9 will be unstable as it presses on the tape.

Methods of assembling a plate spring having a pad are disclosed in, for example, Unexamined Japanese Utility Model Publications (Kokai) Nos. Sho. 60-142876, Sho. 60-142877, Sho. 58-43682, and Sho. 58-43686.

In the configurations disclosed in Unexamined Japanese Utility Model Publications (Kokai) Nos. Sho. 60-142876, and Sho. 60-142877, a plate spring is dropped into a narrow clearance formed by ribs having an adequate shape, or an edge of a plate spring is fittingly attached to ribs. However, such configurations in which a narrow clearance is formed by ribs have a problem in that the assembly of the plate spring is difficult, and the strength of a mold for forming a cassette half is liable to be lowered.

In the configurations disclosed in Unexamined Japanese Utility Model Publications (Kokai) Nos. Sho. 58-43682, and Sho. 58-43686, a plate spring is deformed in a process of assembling the plate spring and the engagement of the plate spring is elastically conducted. In such a configuration, the assembly of the plate spring is very difficult. Because of the spring back of the plate spring, moreover, it is very difficult to equally form the lateral side portions on both sides of the pad in a process of forming the plate spring. Eventually, it is difficult to provide a uniform pressing force exerted by the pad, and also to stably enhance the head touch accuracy of a magnetic tape.

SUMMARY OF THE INVENTION

It is an object of the invention to provide a magnetic tape cassette and a method of assembling a magnetic tape cassette, in which a magnetic shield plate and a plate spring having a pad can be incorporated very easily into upper and lower cassette halves, and, after the incorporation into the cassette, the magnetic shield plate and the plate spring can be fixed so as not to produce chattering, whereby a stable head touch is obtained and drop-out is prevented.

The object of the invention is achieved by a method of assembling a magnetic tape cassette in which a plate spring having a press pad in the vicinity of a magnetic head hole of a lower cassette half is disposed behind head pins, a magnetic shield plate is disposed behind the plate spring, and thereafter an upper cassette half is put on the lower cassette half, comprising the steps of:

fittingly attaching a lower edge of the magnetic shield plate to a shield plate groove which is formed on the lower cassette half; dropping both side-ends of the plate spring into receiving grooves of front ends of a pair of projections which are formed on the lower cassette half; putting the upper cassette half on the lower cassette half, the upper cassette half having ribs which are to contact with an upper edge of the magnetic shield plate and upper edges of the both side-ends of the plate spring; melting the ribs by an ultrasonic welder; and fixing the magnetic shield plate, and holding the plate spring so as to position the plate spring at least in a front and rear direction of the cassette by the molten resin.

Furthermore, the object of the invention is achieved by a magnetic tape cassette which comprises: a plate spring having a press pad which is inside a front opening at a front portion of a cassette body and behind head pins, the cassette body consisting of upper and lower cassette halves; and a magnetic shield plate which is disposed behind the plate spring, wherein at least one of the upper and lower edges of the shield plate in the height direction is fixed by molten resin on an inner face of the cassette, and at least one of the upper and lower edges at both side-ends of the plate spring in the height direction is held so as to position the plate spring at least in a front and rear direction of the cassette by molten resin on the inner face of the cassette.

BRIEF DESCRIPTION OF THE DRAWINGS

A preferred embodiment of the invention will be described with reference to the drawings, wherein.

DETAILED DESCRIPTION OF THE PREFERRED EMBODIMENTS

Figure 1:
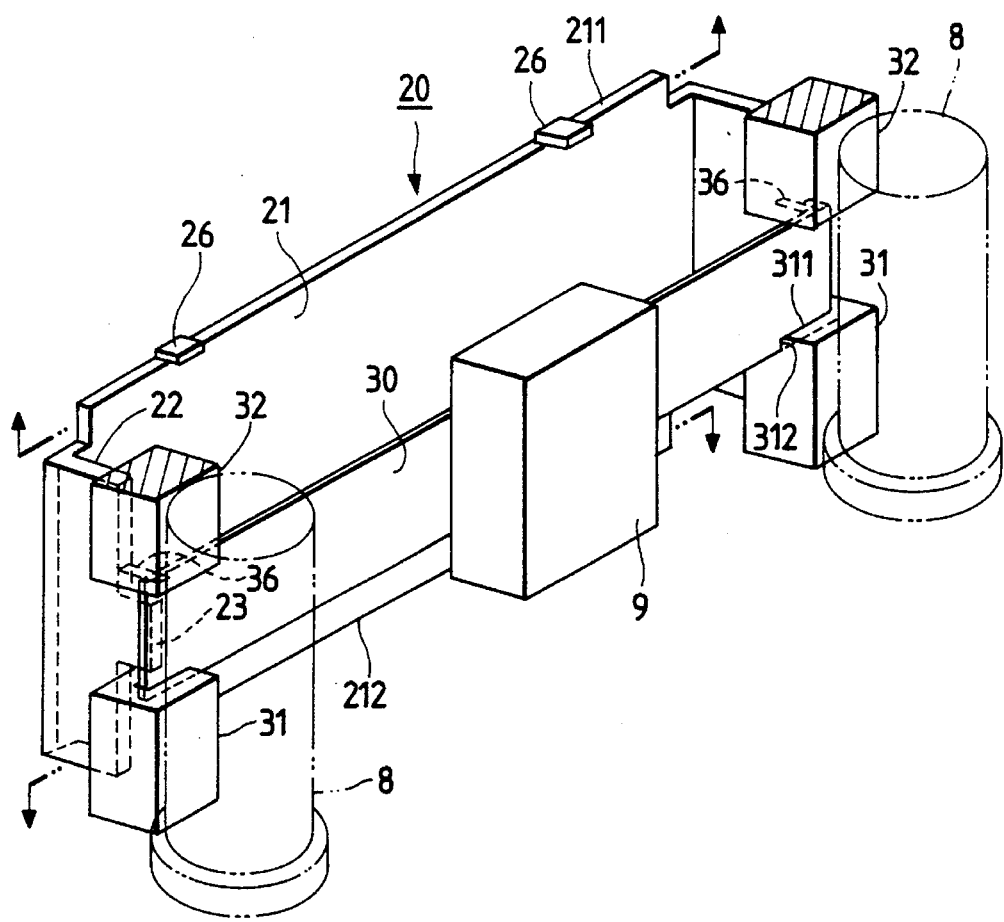
FIG. 1 is an enlarged perspective view of a main portion of the magnetic tape cassette of the invention.
Figure 2:
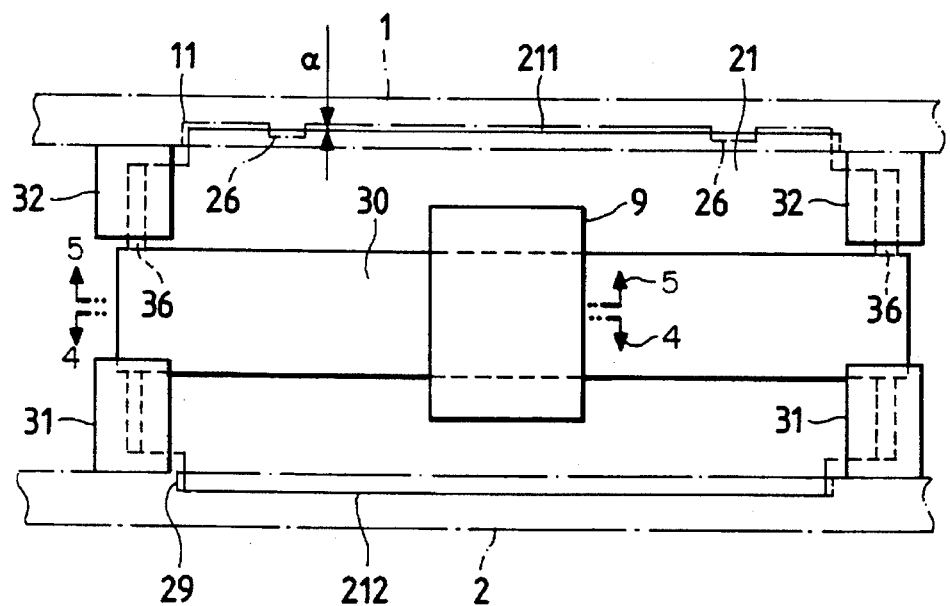
FIG. 2 is a front view of the portion of FIG. 1 as seen from a portion which is in front of the cassette.
Figure 3:
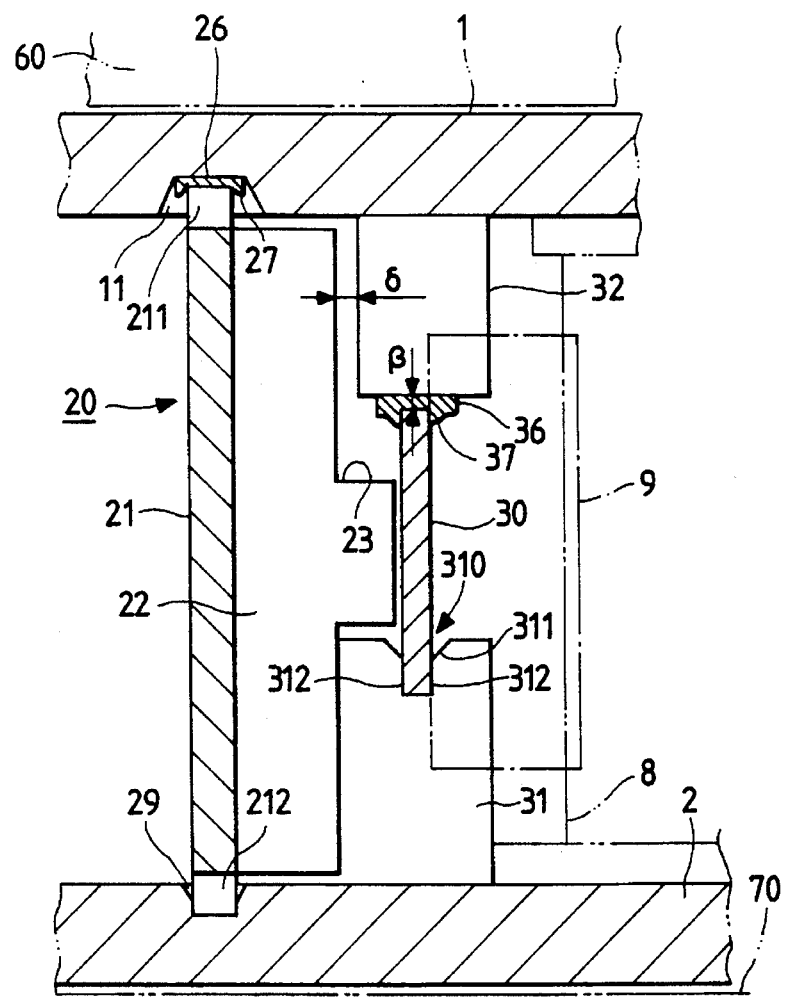
FIG. 3 is a side view of the portion of FIG. 1.
Figure 4:
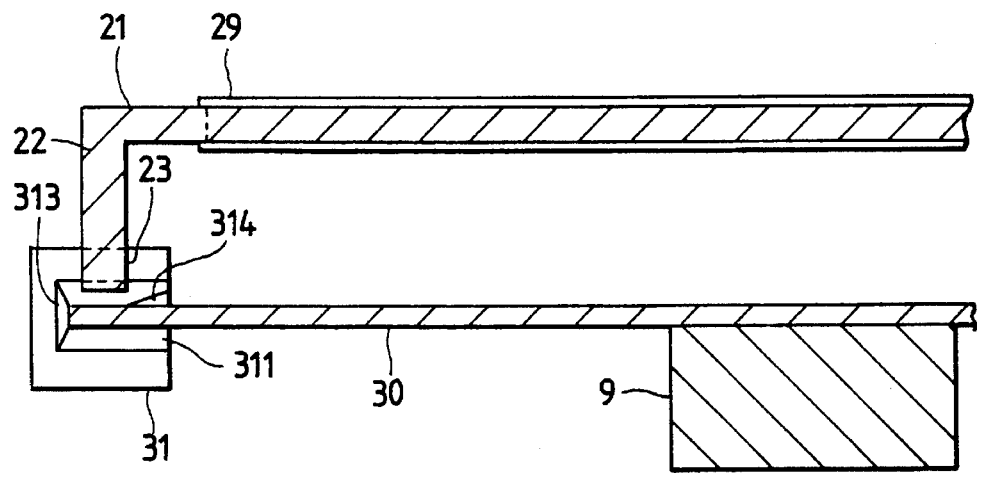
FIG. 4 is a sectional view taken along the line 4—4 in FIG. 2.
Figure 5:
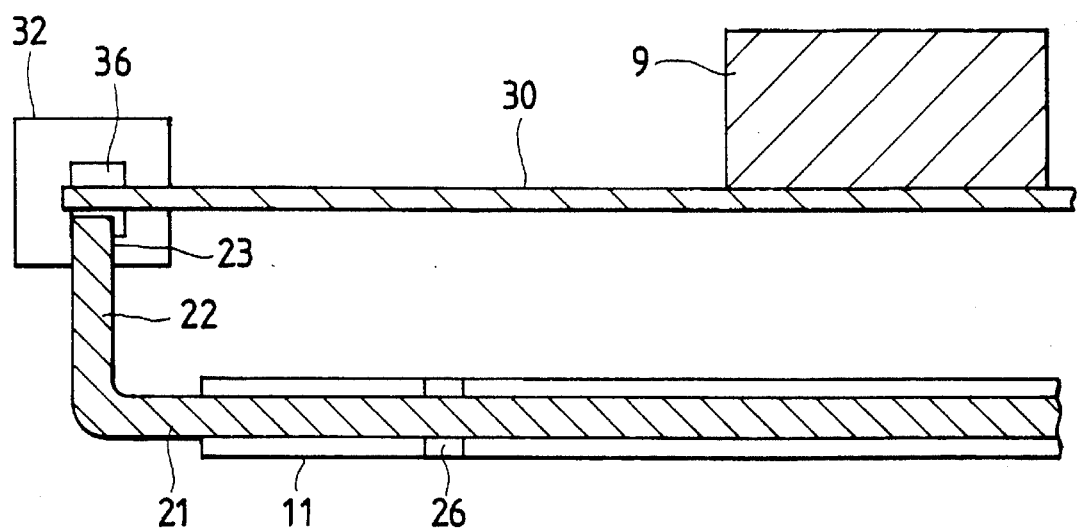
FIG. 5 is a sectional view taken along the line 5—5 in FIG. 2.

FIG. 1 is an enlarged perspective view of a main portion of the magnetic cassette of the present invention, showing a magnetic shield plate and a plate spring having a pad in their assembled state. FIG. 2 is a front view of the portion of FIG. 1, FIG. 3 is an enlarged side view of the portion of FIG. 1, FIG. 4 is a view as seen from the plane 4—4 in FIG. 2, and FIG. 5 is a view as seen from the plane 5—5 in FIG. 2.

Figure 6:
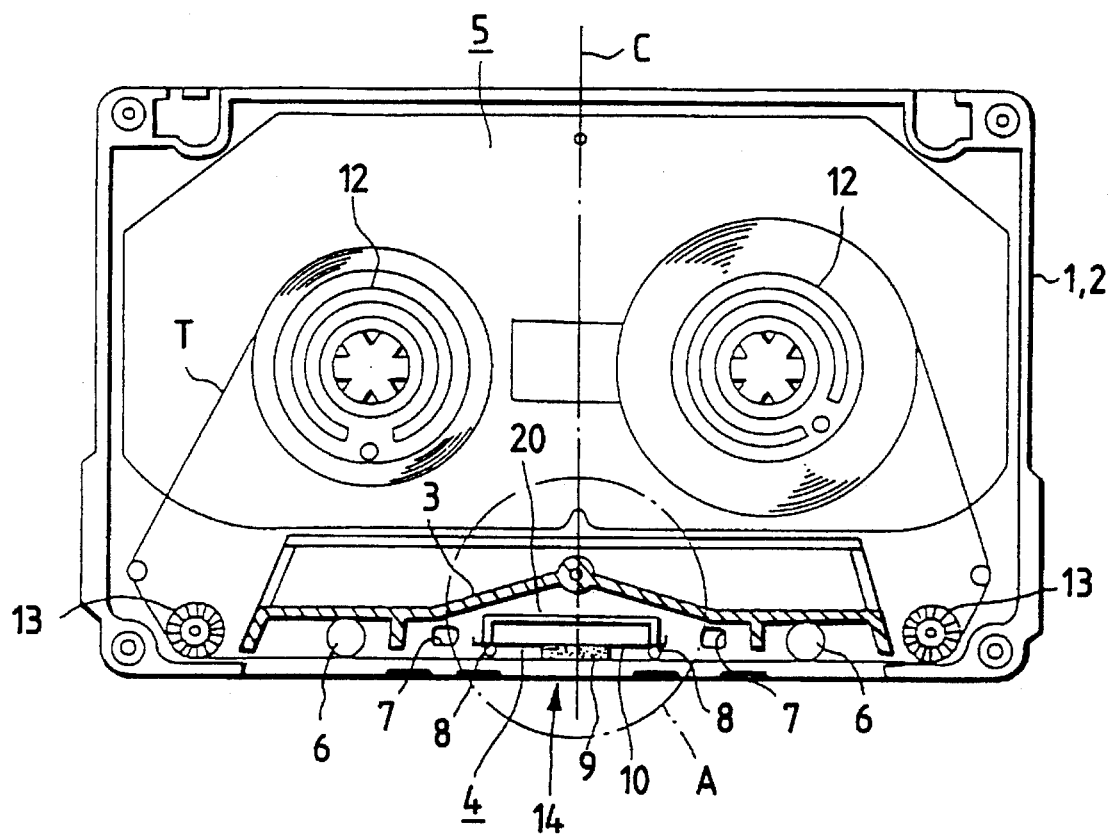
FIG. 6 is a plan view showing the internal structure of a magnetic tape cassette of the prior art.
Figure 7:
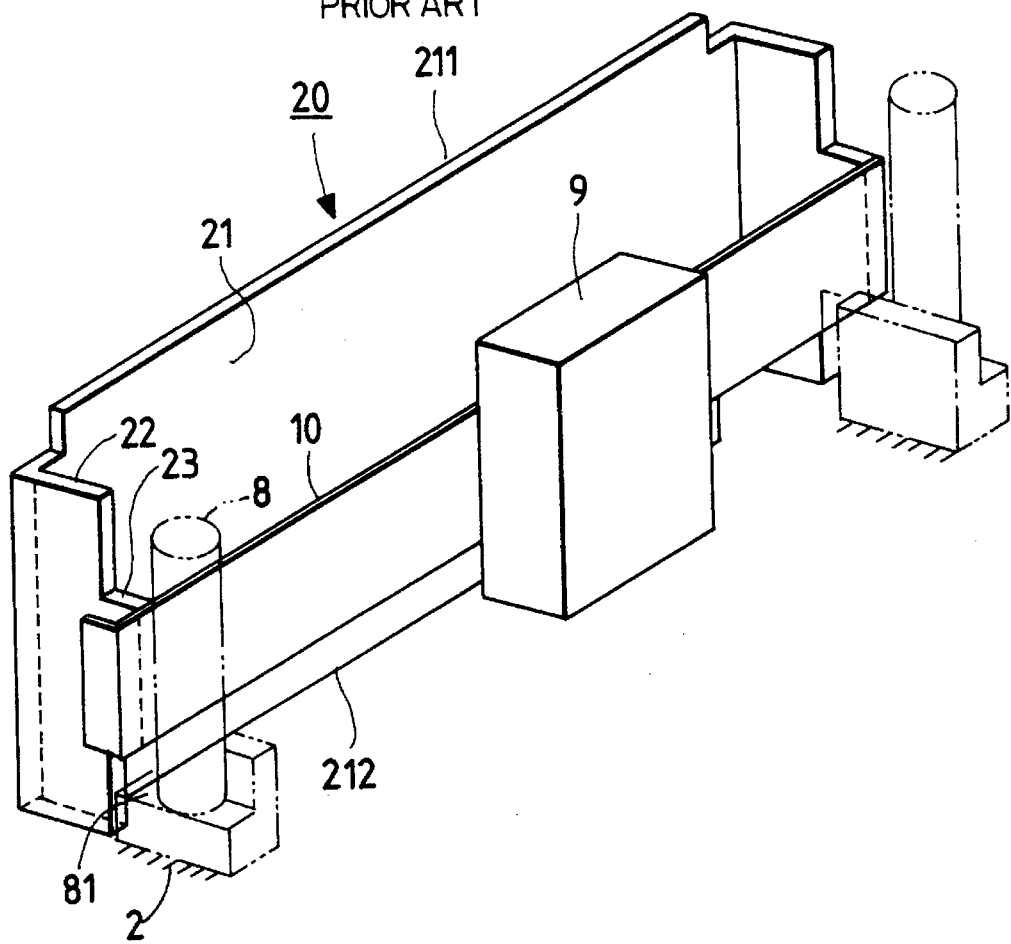
FIG. 7 is a partial perspective view showing the vicinity of a magnetic head hole of the prior art magnetic tape cassette.
Figure 8:
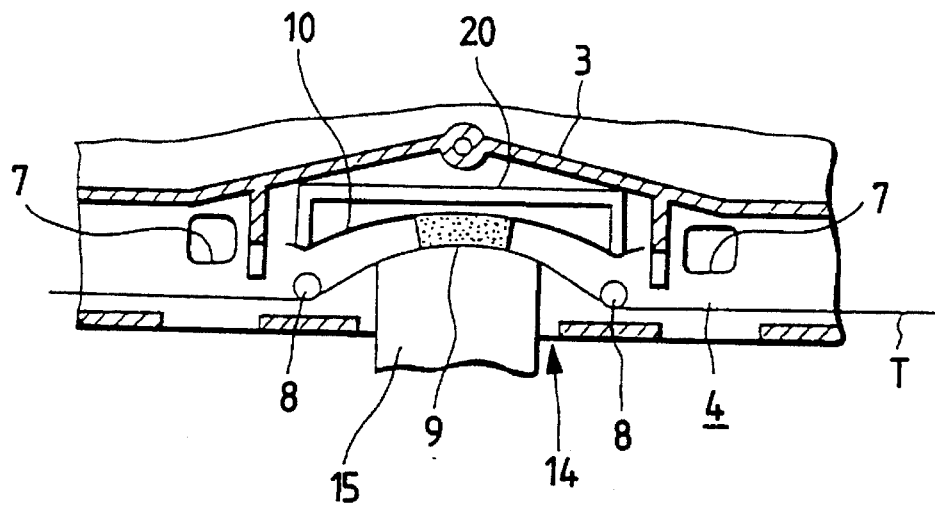
FIG. 8 is a plan view showing the vicinity of the magnetic head hole of the prior art magnetic tape cassette.

Although the entire configuration of the magnetic cassette is not shown, the magnetic tape cassette of the embodiment is fundamentally configured in the same manner as that of FIG. 6, or has a configuration in which upper and lower cassette halves 1 and 2 are adequately welded to each other by an ultrasonic welding.

As shown in FIG. 1, a magnetic shield plate 20 is configured in substantially the same manner as that of the prior art. Specifically, upper and lower edges 211 and 212 of the shield body 21, constituting a flat body, are fitted into the inner faces of the upper and lower cassette halves 1 and 2, respectively. Bent portions 22, which are directed toward the front portion of the cassette body, are formed at both ends of the shield body 21, with wings 23 extending from the front ends of the bent portions 22 with narrower width in a height direction than that of the bend portions 22.

As shown in FIG. 2, grooves 11 and 29, into which the edges of the shield plate 20 are to be inserted, are formed on the inner sides of the upper and lower cassette halves 1 and 2, respectively. The grooves 11 and 29 each has a depth in a range from 0.3 to 0.9 mm with the preferred range from 0.4 to 0.8 mm. Ribs 26, which are made of a resin which melts under control of ultrasonic welding to weld parts together and which is generally made by the same resin as that of the cassette halves such as a polystyrene and a copolymer of acrylonitrile, butadiene and a styrene, project slightly from the bottom of the groove 11 of the upper cassette half 1. Although two ribs 26 are provided as shown in FIG. 2 as one embodiment, three or more ribs may be provided in the grooves 11 if desirable. A clearance $\alpha$ between the upper edge of the magnetic shield plate 20 and the bottom of the groove 11 of the upper cassette half, after assembly and joint by welding of the upper and lower cassette halves 1 and 2 is selected in the range from 0 (no clearance) to the depth of the groove 11, with the preferred range from 0.1 to 0.3 mm.

A height of each rib 26 in the groove 11 before welding should be higher than the clearance $\alpha$, and is preferably selected in the range of 0.2 to 0.3 mm higher than the clearance $\alpha$.

On the other hand, a pair of projections 31 are formed on the inner face of the lower cassette half 2 at positions to the rear of the pair of head pins 8. Grooves 310 for receiving a plate spring 30 are formed on the upper end faces of each of the projections 31. Each of the grooves 310 extends to its opposed end face of the respective projection 31. As shown in FIGS. 3 and 4, each plate spring groove 310 consists of an inlet portion, and a holding portion. The inlet portion is composed of sloped walls 311, which oppose each other in the longitudinal or back and forth direction of the cassette in such a manner that the groove width is increased as one moves upward, and a sloped wall 313, which opposes the respective end portion of the plate spring. The holding portion is composed of vertical walls 312, which are separated from each other by a distance which is slightly greater than the thickness of the plate spring 30. When the plate spring 30 having a press pad 9 attached thereto is placed into the plate spring grooves 310, the lower edges and both side ends of the plate spring 30 are guided by the sloped walls 311 and 313 into the holding portions of the grooves, resulting in the plate spring 30 being supported in a substantially vertical direction.

As shown in FIG. 4, each of the plate spring grooves 310 may be configured so that a setback wall 314, which is inclined toward the magnetic shield plate 20, is formed on a wall of the projection 31 facing the rear of the plate spring 30. This configuration permits the plate spring to bend easily toward the rear side of the cassette when a magnetic head presses the pad 9 in the rearward direction.

Suspended portions 32 are formed on the inner face of the upper cassette half 1 at positions corresponding to the projections 31. The height of each of the suspended portions 32 is selected so that when the cassette halves 1 and 2 are joined by welding to each other with the plate spring 30 positioned in the plate spring grooves 310 of the projections 31, the suspended portions 32 are separated from the plate spring 30 by a small clearance β as shown in FIG. 3. The clearance β is selected in the range from 0.05 to 0.2 mm, and more preferably, from 0.08 to 0.12 mm. Ribs 36, which are made of resin which melts under control of ultrasonic welding to weld parts together, are formed on the lower end faces of the suspended portions 32. Each height of the ribs 36 before welding is higher than the clearance β, and it is selected in the range from 0.08 to 0.2 mm higher than the clearance β.

The ribs 36 are formed at positions on the lower end faces of the suspended portions 32 adjacent to the wings 23 of the magnetic shield plate 20 and are used for welding both of left and right side portions of the plate spring 30 at the each upper edge as described later.

As shown in FIG. 3, the projections 31 may be configured so that their rear faces abut the lower front faces of the bent portions 22 of the magnetic shield plate 20 when the cassette is assembled. This configuration provides vertical support for the magnetic shield plate 20 when the magnetic shield plate 20 is incorporated into the lower cassette half. In contrast, the rear faces of the suspended portions 32 are separated from the upper front faces of the bent portions 22 by a small clearance δ, so that, when the process of assembling the upper cassette half 1 is conducted from the right above position, the upper cassette half does not contact with the magnetic shield plate 20, thereby preventing the assembling property from being impaired.

Although the magnetic shield plate 20 is configured so that the front faces of the wings 23 oppose the rear face of the plate spring 30, the wings 23 are not necessary and may be eliminated.

The method of assembling the thus configured magnetic tape cassette will be described.

At first, the lower edge 212 of the magnetic shield plate 20 is fitted into the groove 29 of the lower cassette half 2 so that the magnetic shield plate 20 stands vertically on the lower cassette half 2. The plate spring 30 having the press pad 9 attached thereto is dropped into the plate spring grooves 310 formed on the upper end faces of the projections 31. At this time, the plate spring 30 is dropped at a position which is slightly in front of the wings 23. This allows the lower edge of the plate spring 30 to slide down the gentle slopes 311 and 313 into the holding portion of the grooves 310, where, the plate spring 30 is held in a vertical position between the vertical walls 312.

After the magnetic shield plate 20, the plate spring 30, a friction sheet, and a magnetic tape, etc. are incorporated into the lower cassette half 2, the upper cassette half 1 is placed on the lower cassette half 2. At this time, the ribs 26 contact with the upper edge 211 of the magnetic shield plate 20, and the ribs 36 contact the upper edge of the plate spring 30.

The stacked upper and lower cassette halves 1 and 2 are placed on a table 70 of an ultrasonic welder. Then, as shown diagrammatically in FIG. 3, a welding head 60 of the ultrasonic welder presses the upper cassette half 1 and an oscillating ultrasonic wave is produced. Accordingly, the ribs 26 and 36 melt so that the magnetic shield plate 20 and the plate spring 30 are welded to the ribs, and also the upper and lower cassette halves 1 and 2 are firmly fixed to each other by welding.

The ultrasonic welding produces welding portions 27, and the magnetic shield plate 20 is firmly fixed by the welded portions 27. Also the plate spring 30 is fixed by welding. When the plate spring 30 is pressed by a magnetic head and the plate spring 30 bends toward the rear side of the cassette, the left and right side portions of the plate spring 30 laterally slide against the welded portion 37. Therefore, it is preferable to position the plate spring 30 so that welded portions 37 block the movement of the spring in the front and rear direction of the cassette at the welded portions 37 and the left and right side portions of the spring can move in the lateral direction of the cassette. The plate spring 30 is allowed to move in the lateral direction of the cassette by, for example, a configuration in which the melting amount is reduced to a low level so that the ribs 36 exert a small welding force, and the plate spring 30 is largely pushed toward the rear side of the cassette after the welding process, thereby scraping off the adhesion face between the welded portion 37 and the plate spring.

According to the above, the magnetic shield plate 20, and the plate spring 30 can satisfactorily be attached in the upper and lower cassette halves 1 and 2 without producing chattering.

In the embodiment described above, the upper and lower cassette halves are fixed to each other by ultrasonic welding. Alternatively, the upper and lower cassette halves may be fastened to each other by screws or the like.

In the embodiment described, the magnetic shield plate is welded to the upper cassette half only, but the magnetic shield plate may be welded to both the upper and the lower cassette halves.

As described above, according to the cassette assembling method of the invention, the lower edge of a magnetic shield plate is fitted into a groove, which is formed on a lower cassette half, both ends of a plate spring are dropped into receiving grooves of the front ends of projections formed on the lower cassette half, an upper cassette half is then placed on the lower cassette half, and ribs are melted by an ultrasonic welder to fix the magnetic shield plate and position the plate spring at least in the longitudinal direction of the cassette. Consequently, it is not necessary to incorporate the magnetic shield plate and the plate spring into the cassette by fitting them into portions of strict dimensional requirements. Hence, the assembling properties of the magnetic shield plate and the plate spring are remarkably excellent, and the magnetic shield plate and the plate spring are firmly fixed by welding to the upper and lower cassette halves after being assembled.

The magnetic tape cassette of the invention has a configuration in which an upper cassette half is put on a lower cassette half, and a magnetic shield plate, and a plate spring are welded by welding portions produced from ribs by ultrasonic welding. Consequently, the magnetic shield plate, and the plate spring are fixed to the upper and lower cassette halves without producing chattering so that scrape resin powder is prevented from being produced and drop-out, caused by the resin powder, is prevented.

What is claimed is:

1. A method of assembling a magnetic tape cassette comprising; upper and lower cassette halves, a plate spring having a press pad attached thereto in the vicinity of a front opening in said cassette for receiving a magnetic head, said plate spring being located behind head pins, and a magnetic shield plate is disposed behind said plate spring, said method comprising the steps of:

fittingly positioning the lower edge of said magnetic shield plate into a shield plate-groove formed on an inner surface of said lower cassette half;

dropping both left and right ends of said plate spring into respective receiving grooves at the upper ends of a pair of projections formed on said lower cassette half;

placing said upper cassette half, having resin ribs located thereon, on said lower cassette half so that said upper half and lower half mate and said ribs contact the upper edge of said magnetic shield plate and the upper edge of said plate spring; and melting said ribs by an ultrasonic welder to fix the position of said magnetic shield plate within said cassette and to hold said plate spring at least in the longitudinal direction of said cassette, wherein said projections formed on said lower cassette half are two in number, and said upper cassette half has two suspended portions at positions corresponding to said two projections, and wherein said step of placing said upper cassette half, comprises: positioning said upper half such that resin ribs on the bottom facing surfaces of said suspended portions contact the respective upper edges of said plate spring which are opposite the lower edges of said plate spring located in said receiving grooves, and further wherein the step of dropping both ends of said plate spring into receiving grooves, comprises: placing said plate spring above said receiving grooves of said projections such that the opposite ends of said plate spring slide down sloped walls of said receiving grooves to respective holding portions of said receiving grooves having vertical walls slightly wider apart than the thickness of said plate spring.

2. The method of claim 1, wherein said magnetic shield plate has a U shape looking from above, and comprises: a main part parallel to said plate spring, respective end parts perpendicular to said main part, and respective wing parts extending outwardly from and in the same direction as said end parts with narrower width in a height direction than that of said end parts, and wherein the step of dropping both ends of said plate spring into receiving grooves comprises dropping said plate spring between said wings and said head pins.

\* \* \* \* \*